United States Patent [19]

Mizuno et al.

[11] Patent Number: 4,975,838

[45] Date of Patent: Dec. 4, 1990

[54] DUPLEX DATA PROCESSING SYSTEM WITH PROGRAMMABLE BUS CONFIGURATION

[75] Inventors: Kenichi Mizuno; Takashi Morita; Teruo Ikeda, all of Yokohama, Japan

[73] Assignee: Hitachi, Ltd., Tokyo, Japan

[21] Appl. No.: 36,509

[22] Filed: Apr. 9, 1987

[30] Foreign Application Priority Data

Apr. 9, 1986 [JP] Japan .................................. 61-79908

[51] Int. Cl.⁵ ...................... G06F 11/20; G06F 15/16; G06F 15/20
[52] U.S. Cl. .................................... 364/200; 364/900; 364/229; 364/240; 364/931.4; 364/940; 371/9.1
[58] Field of Search .................. 371/9, 9.1, 11.1, 11.3; 324/73 R; 364/200 MS File, 900 MS File

[56] References Cited

U.S. PATENT DOCUMENTS

| | | | |
|---|---|---|---|
| 3,303,474 | 2/1967 | Moore et al. | 364/200 |
| 3,812,469 | 5/1974 | Hanck et al. | 364/200 |
| 3,864,670 | 2/1975 | Inoue et al. | 364/200 |
| 3,882,455 | 5/1975 | Heck et al. | 371/9.1 |
| 4,219,873 | 8/1980 | Kober et al. | 364/200 |
| 4,253,146 | 2/1981 | Bellamy et al. | 364/200 |
| 4,270,168 | 5/1981 | Murphy et al. | 364/200 |
| 4,305,125 | 12/1981 | Sato et al. | 364/200 |
| 4,437,184 | 3/1984 | Cork et al. | 364/200 |
| 4,713,793 | 12/1987 | Conforti | 364/900 |
| 4,823,256 | 4/1989 | Bishop et al. | 364/200 |

*Primary Examiner*—Michael R. Fleming
*Assistant Examiner*—Gopal C. Ray
*Attorney, Agent, or Firm*—Antonelli, Terry, Stout & Kraus

[57] ABSTRACT

A duplex data processing system includes two processors each provided with a bus connecting unit which disconnects the associated CPU bus from the cross connection bus in a separate mode or connects the CPU bus to the cross connection bus in a duplex mode. The system operates with a logically unified CPU bus through the connection of the internal CPU buses by the two bus connecting units in both processors.

7 Claims, 6 Drawing Sheets

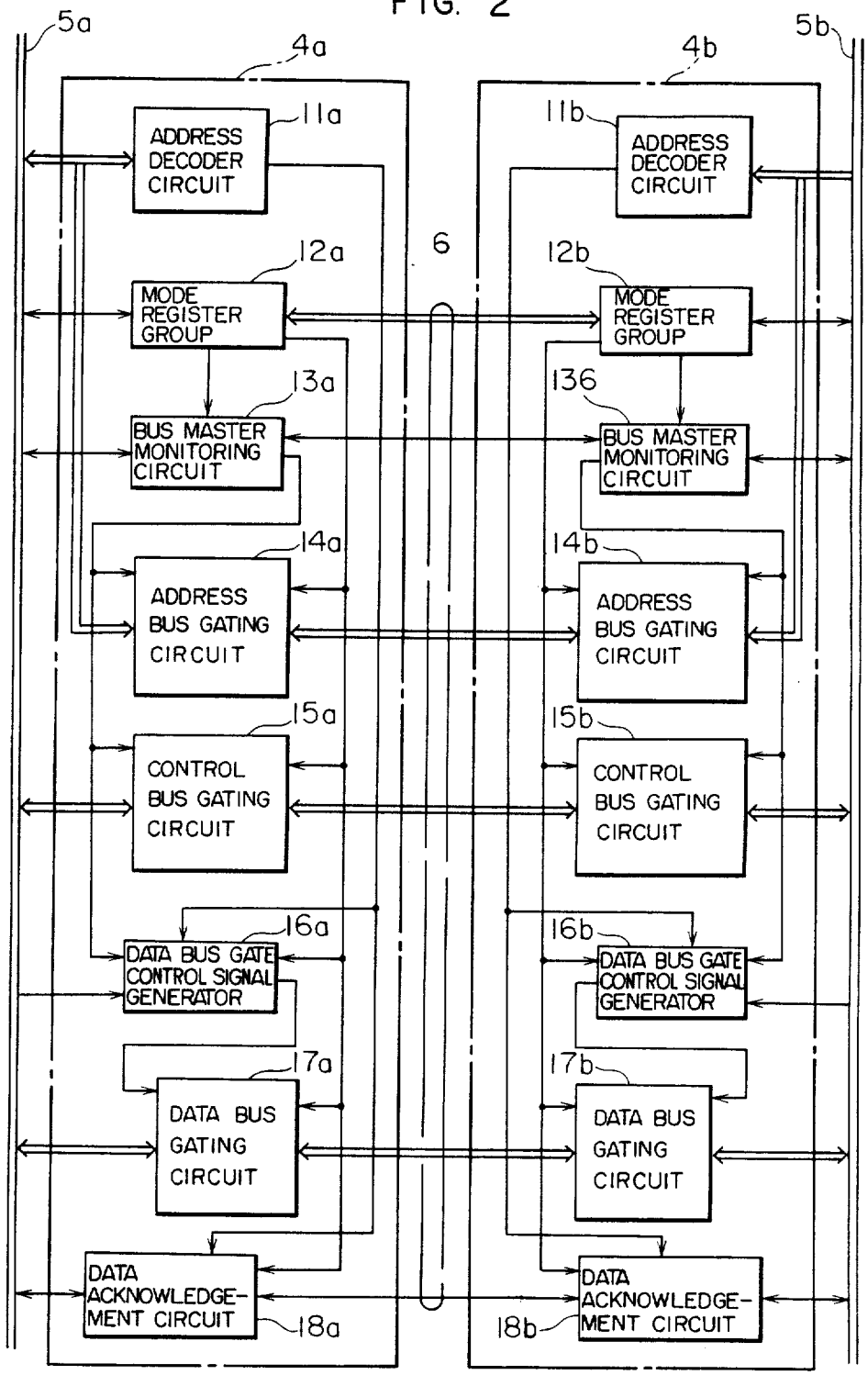

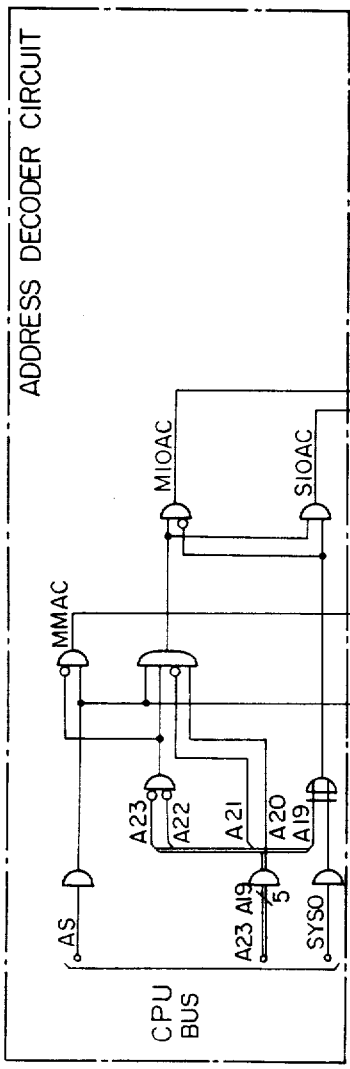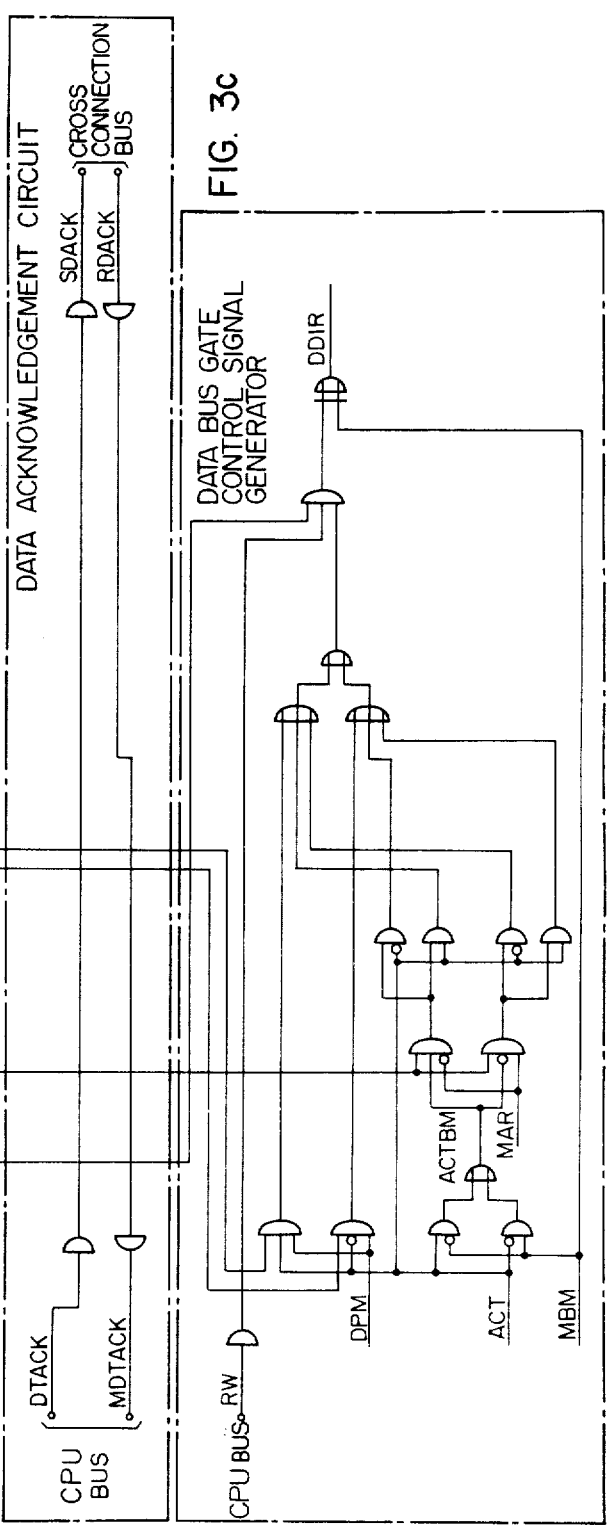

DUPLEX DATA PROCESSING SYSTEM WITH PROGRAMMABLE BUS CONFIGURATION

BACKGROUND OF THE INVENTION

This invention relates to a duplex data processing system, and particularly to a bus connecting facility for linking two processors.

Information processing systems, such as electronic exchanges, which operate uninterruptedly are often provided with a duplex arrangement for processors each consisting of a central processing unit (CPU), memory unit, I/O controller and CPU bus for connecting these units in order to prevent system shutdown caused by a failure. Methods of information communication between the two processors include provision of a common memory unit for both processors, and automatic data transfer for a specific storage area in the memory unit of one processor to that of another processor. However, conventional duplex methods invariably designate the two processors to be operate as an active system and a stand-by system, respectively, and therefore they necessitate very complicated system control. Data processing systems of this type are described in Japanese Patent Publication No. 58-54421 and Japanese Patent Unexamined Publication No. 59-125422.

SUMMARY OF THE INVENTION

An object of this invention is to provide a duplex data processing system capable of easy communication of information between two processors.

Another object of this invention is to provide a duplex bus connecting facility for a duplex data processing system which is capable of easy data transfer from the processor in the active system to the processor in the stand-by system.

A further object of this invention is to provide a duplex data processing system which is capable of easily providing to the memory units of two processors the same data, thereby diminishing the process interruption at switching of the processors.

In order to achieve the above objectives, each processor in the duplex system is provided with a bus connecting unit so that the CPU bus in the active processor and the CPU bus in the stand-by processor are connected using the two bus connecting units through a cross connection bus. The use of the two bus connecting units for connecting the two CPU buses logically unifies the CPU buses, and the memory units and I/O controllers of the active and stand-by systems are connected by the unified CPU bus to the CPU in the active processor. In both processors, the CPUs, memory units and I/O controllers are all given addresses, and especially the memory units of the active and stand-by processors are given the same address so that the CPU in the active processor can access both memory units simultaneously.

BRIEF DESCRIPTION OF THE DRAWINGS

FIG. 2 is a block diagram showing the internal arrangement of the bus connecting units 4a and 4b;

FIG. 3a is a functional diagram of the address decoder circuits 11a and 11b;

FIG. 3b is a functional diagram of the bus acknowledgement circuits 18a and 18b;

FIG. 3c is a functional diagram of the data bus gate control signal generators 16a and 16b;

DESCRIPTION OF THE PREFERRED EMBODIMENT

Figure 1:
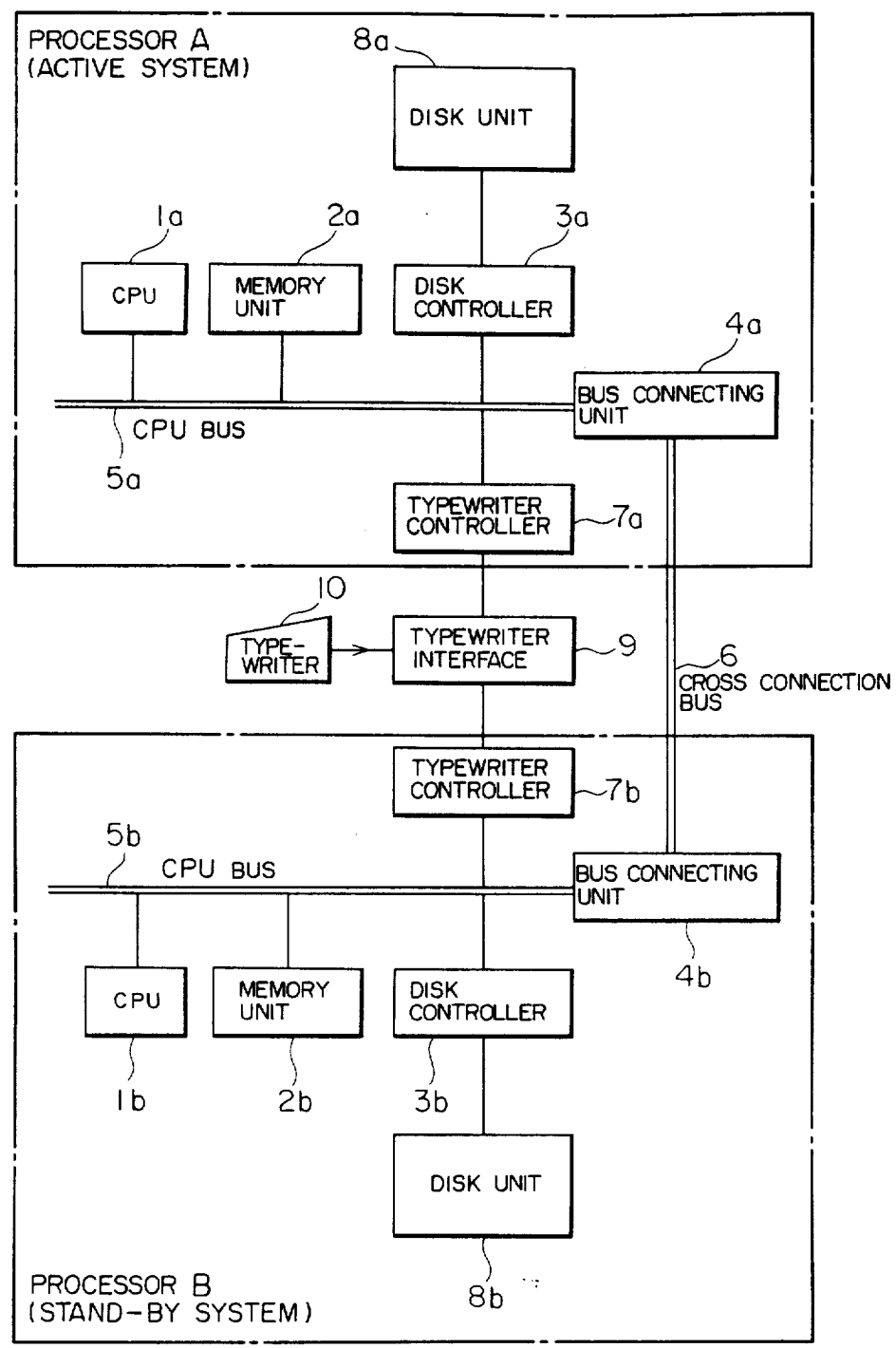
FIG. 1 is a block diagram of the duplex data processing system according to the present invention.

FIG. 1 shows the system configuration of the duplex data processing system of the present invention. The duplex system includes processors A and B having the same structure. The processors A and B are allocated as an active system and a stand-by system, respectively, in the following discussion, although this allocation is not fixed and their roles can be exchanged.

The processor A includes a CPU 1a and a memory unit 2a, and a disk controller 3a for controlling a disk unit 8a and a typewriter controller 7a as I/O controllers. These devices are interconnected through a CPU bus 5a. Similarly, the processor B includes a CPU 1b and a memory unit 2b, and a disk controller 3b for controlling a disk unit 8b and a typewriter controller 7b as I/O controllers. These devices are interconnected through a CPU bus 5b. Provided between both processors is a typewriter interface 9, which receives data entered on a typewriter 10 and sends it to the typewriter controllers 7a and 7b in both processors and also receives data from the typewriter controllers 7a and 7b and sends the data to the typewriter 10. The processors A and B are provided therein with bus connecting units 4a and 4b, by way of which the CPU buses 5a and 5b in both processors A and B are interconnected through a cross connection bus 6.

The operation of the overall system shown in FIG. 1 will be described. The bus connecting units 4a and 4b have mode registers which are set by the commands from the CPUs, as will be described later, and when specific mode registers are set to a "Separate mode", the bus connecting units 4a and 4b disconnect the cross connection bus 6 from the CPU buses 5a and 5b, respectively. Under this condition, the two CPU buses 5a and 5b are separated from each other, and the processors A and B can operate independently. This operating mode is used in the case, for example, when the processor A implements the control of a telephone exchange and a processor B runs the self-diagnostic program. Namely, the system is not duplex in this mode.

When the bus connecting units 4a and 4b have their mode registers set to a "Duplex mode", the units 4a and 4b connect their CPU buses 5a and 5b, respectively, by way of the cross connection bus 6. Then, the CPU buses 5a and 5b are linked through the bus connecting unit 4a, the cross connection bus 6 and the bus connecting unit 4b. At this time, the CPU 1b in the stand-by processor B is disconnected from the CPU bus 5b, and the CPU 1a in the active processor A dominates the unified CPU bus. Accordingly, the CPU 1a makes access to the memory unit 2a, disk controller 3a and typewriter controller 7a, and further can access the memory unit 2b, disk controller 3b and typewriter controller 7b by way of the CPU bus 5a, bus connecting unit 4a, cross connection bus 6, bus connecting unit 4b and CPU bus 5b.

Figure 6:
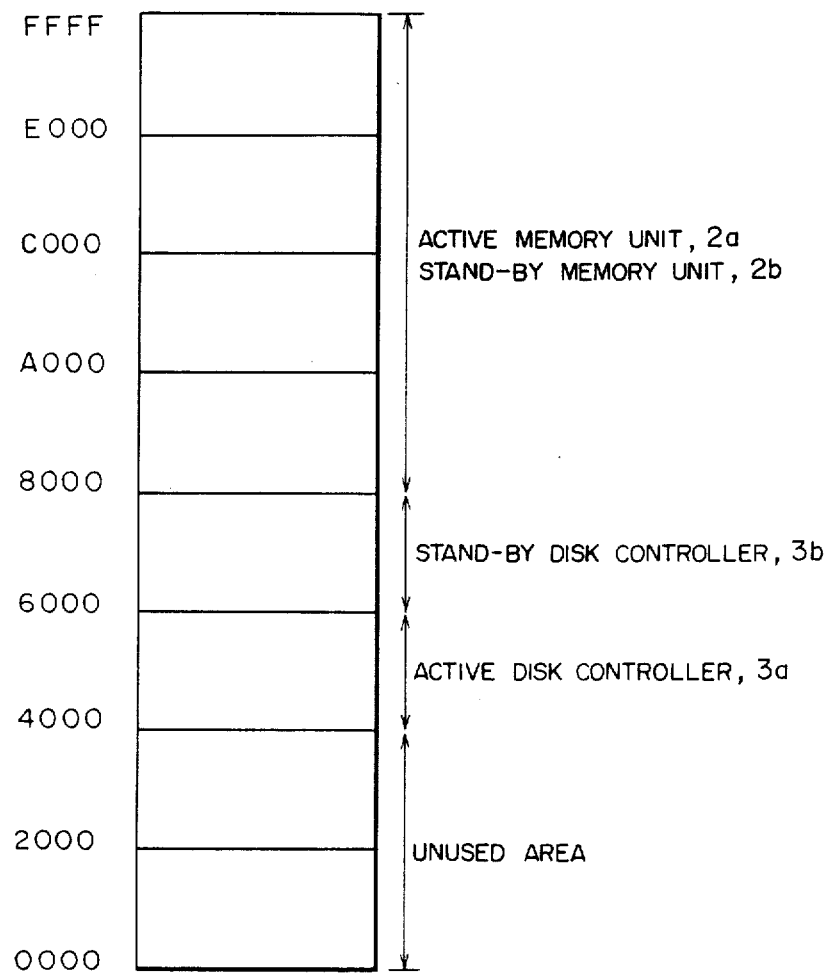
FIG. 6 is a diagram showing address mapping for the system devices.

Both processors A and B individually address their CPUs, disk controllers, typewriter controllers and bus connecting units, while the memory units 2a and 2b are given the same address in accordance with this invention. FIG. 6 shows an example of memory mapping for the memory units and disk controllers. The disk controllers 3a and 3b are given individual address areas 4000-5FFF and 6000-7FFF, respectively, while the memory units 2a and 2b are given the same address area 8000-FFFF (Note: the address is expressed in hexadecimal notation).

Accordingly, the CPU 1a can access simultaneously the two memory units 2a and 2b having the same address space, and can access selectively any of the I/O controllers having separate address spaces. It is also possible for the CPU 1a to make access only to one memory unit, and this will be described in detail later.

Next, the internal arrangement and operation of the bus connecting units 4a and 4b, which characterized the present invention, will be described with reference to FIGS. 2 to 5. FIG. 2 shows the internal arrangement of the bus connecting units 4a and 4b. Reference numerals 11a and 11b denote address decoder circuits which receive on the CPU buses the address signal sent from the bus master which controls the CPU buses (besides the CPUs 1a and 1b, any of the disk controllers 3a and 3b, and typewriter controllers 7a and 7b can be the bus master in this system), and detect the bus master's access destination through signal analysis.

FIG. 3a shows in functional diagram the address decoder circuits 11a and 11b. The address decoder circuit receives a 5-bit address signal (A23-A19) and an address strobe signal (AS) indicating the validity of the address signal, and analyzes as to which of the memory units and I/O controllers in both systems is accessed. As a result of analysis, the address decoder circuit 11a or 11b produces signal MMAC in the case of access to the memory unit, signal SIOAC in the case of access to the I/O controller in its own system, or signal MIOAC in the case of access to the I/O controller in another system, and sends the signal to data bus gate control signal generator 16a or 16b.

Figure 4:
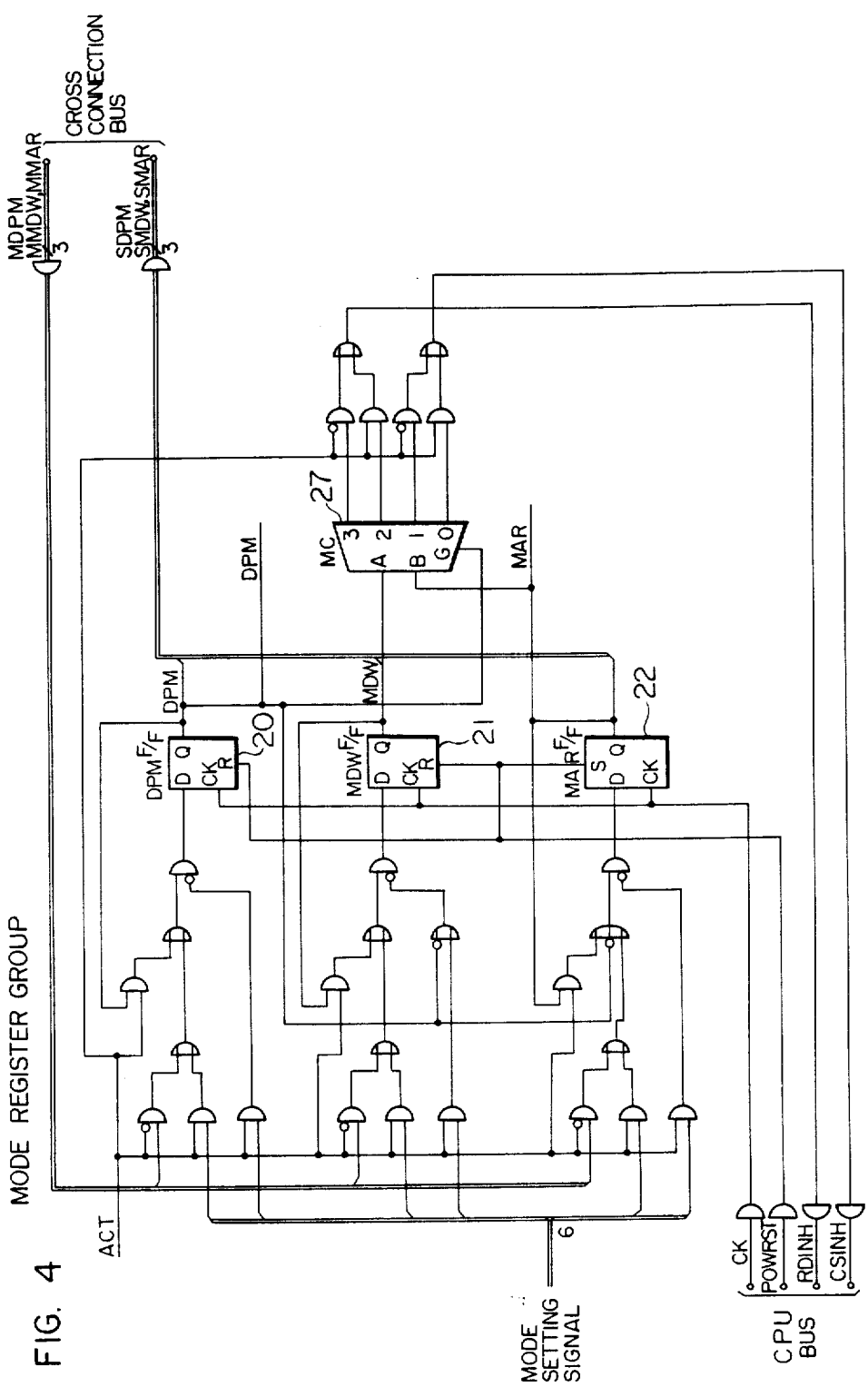
FIG. 4 is a functional diagram of the mode register groups 12a and 12b.

Reference numbers 12a and 12b denote groups of mode registers, in which are set the mode signals from the CPU in the active processor, indicative of Separate or Duplex node, Double Write or Single Write mode for memory access and Read Active System or Read Stand-by System mode in Duplex mode. These mode register groups 12a and 12b produce control signals to the memory units depending on the modes extablished, and control address bus gating circuits 14a and 14b, control bus gating circuits 15a and 15b, etc. FIG. 4 shows in functional diagram the mode register groups 12a and 12b.

Figures 5A, 5B, 5C, 5D:
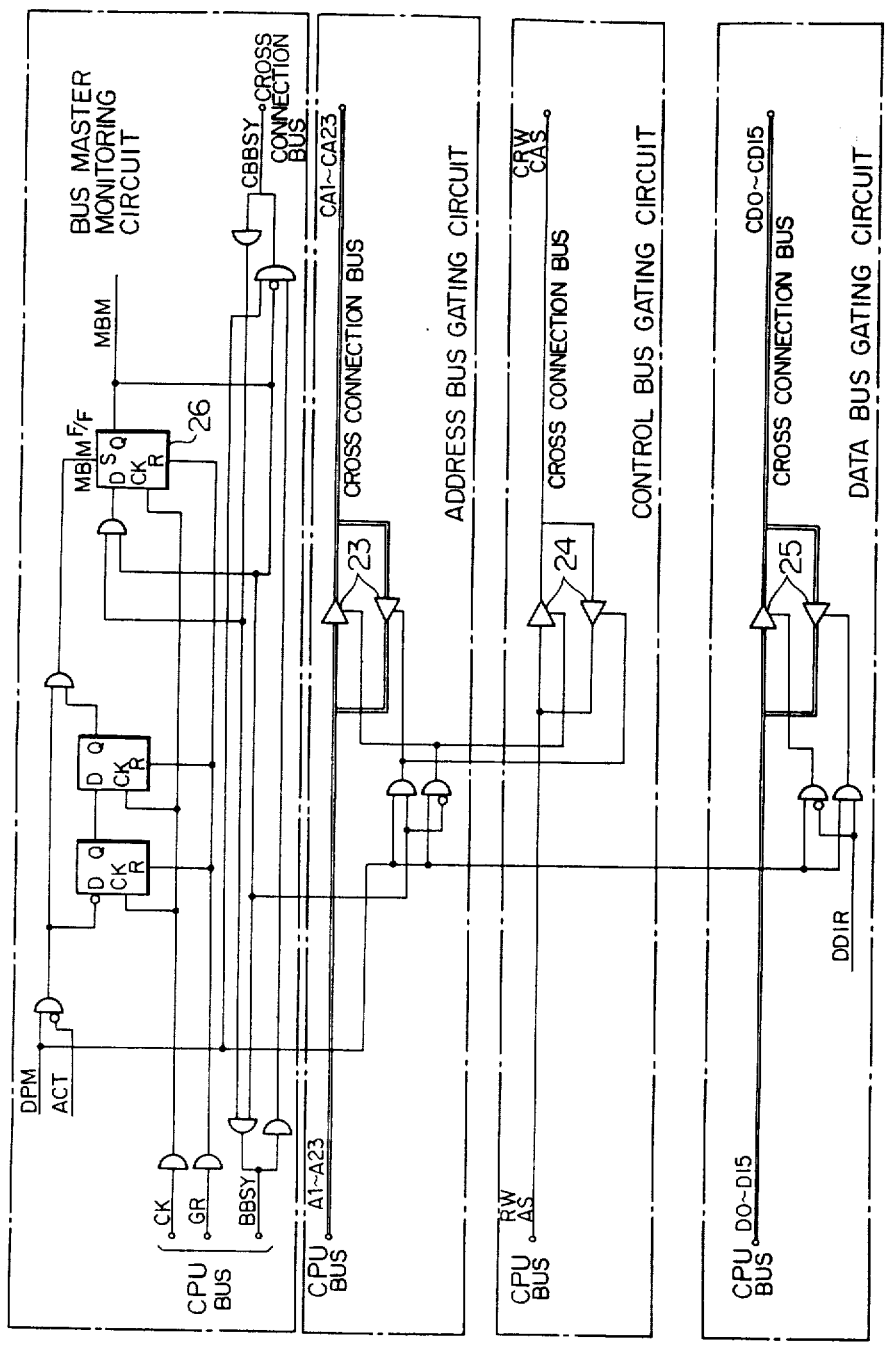
FIG. 5a is a functional diagram of the bus master monitoring circuits 13a and 13b.
FIG. 5b is a functional diagram of the address bus gating circuits 14a and 14b.
FIG. 5c is a functional diagram of the control bus gating circuits 15a and 15b.
FIG. 5d is a functional diagram of the data bus gating circuits 17a and 17b.

Reference numbers 13a and 13b denote bus master monitoring circuits which detect whether the bus master controlling the CPU bus resides in its own processor or in another processor, and which deliver the result to the address bus gating circuits 14a and 14b, control bus gating circuits 15a and 15b, and data bus gating circuits 16a and 16b. FIG. 5a shows in functional diagram the bus master monitoring circuits 13a and 13b.

Reference numbers 14a and 14b denote address bus gating circuits which implement the address bus direction control based on the mode information from the mode register groups 12a and 12b and the detected results from the bus master monitoring circuits 13a and 13b. FIG. 5b shows in functional diagram the address bus gating circuits 14a and 14b.

Reference numbers 15a and 15b denote control bus gating circuits which implement the direction control for the bus control signal based on the mode information from the mode register groups 12a and 12b and the detected results from the bus master monitoring circuits 13a and 13b. FIG. 5c shows in functional diagram the control bus gating circuits 15a and 15b.

Reference numbers 16a and 16b denote data bus gate control signal generators which determine the data bus direction which is dependent on various signals indicative of the access destination provided by the address decoder circuits 11a and 11b, based on the mode information from the mode register groups 12a and 12b, the detected results from the bus master monitoring circuits 13a and 13b, the read/write signal (RW) produced by the bus master, and information (ACT) as to whether the self processor is of active system or stand-by system. FIG. 3c shows in functional diagram the data bus gate control signal generators 16a and 16b.

Reference numbers 17a and 17b denote data bus gating circuits which implement the data bus direction control based on the mode information from the mode register groups 12a and 12b and the determination results from the data bus gate signal generators 16a and 16b. FIG. 5d shows in functional diagram the data bus gating circuits 17a and 17b.

Reference numbers 18a and 18b denote data acknowledgement circuits which transfer the data acknowledge signal from the bus master access destination to the bus master. FIG. 3b shows in functional diagram the data acknowledgement circuits 18a and 18b.

Next, the operation of the bus connecting circuits 4a and 4b will be described. Initially, after the system has been turned on, the one of the two bus connecting units 4a and 4b which has started up earlier determines that its processor is to serve as the active system and the other processor is to serve as the stand-by system. In the following discussion, the processor A is assumed to be the active system and the processor B to be the stand-by system. The mode register groups 12a and 12b shown in FIG. 4 are initialized by being supplied with signal POWRST. Then, a DPM flip-flop 20 is reset to hold a Separate mode, status a MDW flip-flop 21 is reset to hold a Single Write mode, status and a MAR flip-flop 22 is set to hold a Read Active System mode status.

The DPM flip-flop 20 holding a Separate mode status provides a "0" output signal, causing one of the gates 23 within each of the address bus gating circuits 14a and 14b in FIG. 5b to have its output rendered high impedance. Similarly, one of the gates 24 within each of the control bus gating circuits 15a and 15b in FIG. 5c and one of the gates 25 within each of the data bus gating circuits 17a and 17b are made to have their outputs rendered high impedance. Consequently, the cross connection bus 6 is disconnected from the CPU bus 5a and from the CPU bus 5b, and the processors A and B are allowed to operate independently.

For the transition of the system from Separate mode to Duplex mode, the CPU 1a in the active processor issues a duplex mode setting signal to the mode register group 12a in the bus connecting unit 4a of active system so that the DPM flip-flop 20 shown in FIG. 4 is set to hold a Duplex mode status. The state of the DPM flip-flop 20 in the active mode register group 12a is imparted to the mode register group 12b of the stand-by system, and the DPM flip-flop in the stand-by mode register group 12b holds a Duplex mode status accordingly. Having a Duplex mode set in the mode register groups 12a and 12b of both systems, the CPU buses 5a and 5b are connected logically through the bus connecting unit 4a, cross connection bus 6 and bus connecting unit 4b. At the same time, the stand-by CPU 1b makes all output gates to the CPU bus have high impedance state, and it is disconnected from the CPU bus 5b. The bus master monitoring circuit 13b in the stand-by bus connecting unit 4b sets the MBM flip-flop 26 in response to signal ACT indicative of the active system or stand-by system and signal DPM indicative of Duplex mode in FIG. 5a, and thereafter stores an indication that the bus master resides in another processor in response to the BBSY signal indicative of "bus busy" issued by the bus master.

In making access to the memory unit by the active CPU 1a in Duplex mode, there are two modes including data writing to the memory unit and data reading out of the memory unit. Modes of data writing include a Double Write mode in which memory units of both systems are accessed simultaneously for writing and a Single Write mode in which only one memory unit out of two in two systems is accessed for writing. Modes of data reading include a Read Active System mode in which the memory unit of the active system is read out and a Read Stand-by System mode in which the memory unit of the stand-by system is read out.

In the initial state, each of the mode register groups 12a and 12b in FIG. 4 has its MDW flip-flop 21 reset indicative of a Single Write mode. In a Double Write mode, the active CPU 1a issues a double write mode setting signal to the mode register group 12a in the active bus connecting unit 4a, and the MDW flip-flop 21 is set to hold a Double Write mode status. The state of the MDW flip-flop 21 in the active mode register group 12a is imparted to the stand-by mode register group 12b (SMDW→MMDW), causing the MDW flip-flop in the stand-by mode register group 12b to be set.

In the initial state, the mode register group 12a has its MAR flip-flop 22 set to indicate a Read Active System mode status. For the transition to a Read Stand-by System mode, a active CPU 1a issues the read stand-by system mode setting signal to the active mode register group 12a so that the MAR flip-flop 22 is reset to hold a Read Stand-by System mode status. The state of the MAR flip-flop 22 in the active mode register group 12a is imparted to the stand-by mode register group 12b (SMAR→MMAR), causing the MAR flip-flop 22 in the stand-by mode register group 12b to be reset.

In compliance with the modes held in the MDW flip-flop 21 and MAR flip-flop 22, MCs 27 in the mode register groups 12a and 12b in FIG. 4 produce control signals to the memory units. For example, in a Double Write mode and, at the same time, a Read Active System mode, the MC 27 in the stand-by mode register group 12b issues a signal RDINH to its memory unit so that it does not read out data. In a Double Write mode and, at the same time, a Read Stand-by System mode, the MC 27 in the active mode register group 12a issues a signal RDINH to its memory unit so that it does not read out data. In another case of the Single Write mode and, at the same time, the Read Active System mode, the MC 27 in the stand-by mode register group 12b issues a signal CSINH to its memory unit so that it halts the operation thereof. In Single Write mode and, at the same time, a Read Stand-by System mode, the MC 27 in the active mode register group 12a issues a signal CSINH to its memory unit so that it halts the operation thereof. The memory units 2a and 2b are controlled as to their operation by these signals.

The operation of the bus connecting units 4a and 4b will be described for the case of the active CPU 1a in a Double Write mode and at the same time in a Read Stand-by System mode. In this case, the bus connecting units 4a and 4b have their mode register groups 12a and 12b holding a Duplex mode status in the DPM flip-flop 20 in FIG. 4, a Double Write mode in the MDW flip-flop 21, and a Read Stand-by System mode in the MAR flip-flop 22. Since in this case the bus master (CPU 1a) dominating the CPU bus resides in the active processor A, the bus master monitoring circuit 13a in the bus connecting unit 4a has its MBM flip-flop reset to provide a "0" MBM signal indicating that the bus master resides in the self that system. In contrast, the bus master monitoring circuit 13b in the bus connecting unit 4b has its MBM flip-flop set to provide a "1" MBM signal indicating that the bus master resides in another system.

Consequently, the address bus gating circuit 14a in the bus connecting unit 4a switches the gates 23 from CPU bus 5a to cross connection bus 6 in response to a "1" DPM signal indicative of the Duplex mode and the above "0" MBM signal. Similarly, the control bus gating circuit 15a switches the gates 24 from CPU bus 5a to cross connection bus 6 in response to the "1" DPM signal and "0" MBM signal. In contrast, the address bus gating circuit 14b in the bus connecting unit 4b switches the gates 23 and 24 from cross connection bus 6 to CPU bus 5b in response to the "1" DPM signal and "1" MBM signal.

The bus connecting unit 4a has its mode register group 12a issuing a signal RDINH to its memory unit so that it does not read out data, based on the mode information in the DPM flip-flop 20, MDW flip-flop 21 and MAR flip-flop 22. Accordingly, when the CPU 1a reads out data from memory, the memory unit 2a of the active system does not output data, thereby preventing the collision of data read out from the memory units on the CPU bus.

In case it is intended to write data simultaneously to the memory units 2a and 2b from the CPU 1a, the CPU 1a issues the address signal allotted commonly to the memory units 2a and 2b and write signal RWO indicative of the write cycle, and subsequently issues the address strobe signal (AS) indicative of the validity of the address signal. These signals are delivered to the memory unit 2a over the CPU bus 5a, and the memory unit 2a is activated. The same address signal is sent over the CPU bus 5a to the memory unit 2b by way of the address bus gating circuit 14a, cross connection bus 6, address bus gating circuit 14b and CPU bus 5b, and the write signal (RW) and memory strobe signal (AS) are sent over the CPU bus 5a to the memory unit 2b by way of the control bus gating circuit 15a, cross connection bus 6, control bus gating circuit 15b so that CPU bus 5b, and the memory unit 2b is activated. These signals are further received by the address decoder circuits 11a and 11b in the bus connecting unit 4a and 4b, which in turn produce the MMAC signal indicative of memory access.

The data bus gate control signal generator 16a in the bus connecting unit 4a determines the data bus direction on condition in FIG. 3c that the mode signal DPM is "1", MAR is "0", signal MBM is "0 ", write signal RW is "0", signal ACT indicating that the self processor is of active system is "1", and signal MMAC is "1", and sends a resulting "0" DDIR signal to the data bus gating circuit 17a. The data bus gating circuit 17a switches the gate switching circuit 25 from CPU bus 5a to cross connection bus 6 on condition in FIG. 5d that the signal DPM is "1" and signal DDIR is "0". In contrast, the data bus gate signal generator 16b in the bus connecting unit 4b determines the data bus direction on condition in FIG. 3c that the mode signal DPM is "1", MAR is "0", signal MBM is "1", write signal RW is "0", signal ACT is "0", signal MMAC is "1", and sends a resulting "1" DDIR signal to the data bus gating circuit 17b. The data bus gating circuit 17b switches the gate switching circuit 25 from cross connection bus 6 to CPU bus 5b on condition in FIG. 5d that the signal DPM is "1" and signal DDIR is "1".

In this state, the CPU 1a sends out data, and it is delivered to the memory unit 2a over the CPU bus 5a and at the same time to the memory unit 2b by way of the CPU bus 5a, data bus gating circuit 17a, cross connection bus 6, data bus gating circuit 17b and CPU bus 5b. On receiving the data from the CPU 1a, the memory units 2a and 2b each issue a data acknowledge signal (DTACK). The DTACK signal from the memory unit 2a is delivered directly to the CPU 1a over the CPU bus 5a, while the DTACK signal from the memory unit 2b is delivered to the CPU 1b by way of the CPU bus 5b, data acknowledgement circuit 18b, cross connection bus 6, data acknowledgement circuit 18a and CPU bus 5a (DTACK=SDACK→RDACK=MDTACK). On receiving the DTACK signals (DTACK and MDTACK) from the two memory units, the CPU 1a completes the bus cycle.

In another case where the CPU 1a reads data out of the memory unit 2a of the stand-by system, the CPU 1a issues the address signal and address strobe signal (AS) as in the write operation and in this case a "1" read signal (RW) indicative of the read cycle. These signals are delivered to the memory units 2a and 2b so that they are activated as in the write operation. At this time, the RDINH signal for preventing the mode register group 12a in the bus connecting unit 4a from outputting data to the memory unit 2a is received by the memory unit 2a, and therefore the memory unit 2a does not output data even though it is enabled.

The data bus gate control signal generator 16a makes a reversal determination for the data bus direction in response to the change in the condition of the "1" read signal RW in FIG. 3c, and issues a resulting "1" DDIR signal to the data bus gating circuit 17a. The data bus gating circuit 17a switches the gate switching circuit 25 from cross connection bus 6 to CPU bus 5a on condition in FIG. 5d that the signal DPM is "1" and the signal DDIR is "1". Similarly, the data bus gate control signal generator 16b makes a reversal determination for the data bus direction in response to the change in the "1" read signal RW in FIG. 3c, and issues a resulting "0" DDIR signal to the data bus gating circuit 17b. The data bus gating circuit 17b switches the gate switching circuit 25 from CPU bus 5b to cross connection bus 6 on condition in FIG. 5d that the signal DPM is "1" and the signal DDIR is "0".

After the data bus direction has been switched, the memory unit 2b reads out data, and it is sent to the CPU 1a by way of the CPU bus 5b, data bus gating circuit 17b, cross connection bus 6, data bus gating circuit 17a and CPU bus 5a. On completion of reading out of data from the memory unit 2b, the memory units 2a and 2b issue the DTACK signals to the CPU 1a in the same manner as in the write operation, and the CPU 1a completes the bus cycle.

Although the memory access operation by the CPU 1a of the active system has been described for the case of Double Write mode and Read Stand-by System mode, the address bus, the bus control signals and the data bus direction are controlled in the respective manners in the remaining cases of Double Write & Read Active System mode, Single Write & Read Stand-by System mode, and single Write & Read Active system mode. The CPU buses 1a and 1b are linked logically through the bus connecting unit 4a, cross connection bus 6 and bus connecting unit 4b. The bus connecting units 4a and 4b operate in the same way for the access to an I/O controller, and in this case only one of the I/O controllers in both systems is accessed due to individual address assignment described previously.

As described above, the inventive duplex data processing system is operative through the logical unification of CPU buses in the two processors, whereby information communication between the two processors can take place simply. Moreover, it is easy to cause the memory units in the two processors to store the same data, whereby process interruption at the time of switching from active system to the stand-by system can be minimized.

We claim:

1. A duplex data processing system comprising:
two processor systems, one of which is operating as an active system and the other of which is operating as a stand-by system, respectively, in a duplex system mode of operation, each processor system including a central processing unit (CPU), a memory unit and an input/output controller interconnected by a CPU bus, the memory units in the two processor systems operating with the same address mapping;
a cross connection bus provided between said two processor systems; and
bus connecting means provided in each of said processor systems and connected to the CPU bus within said processor system and to said cross connection bus, for disconnecting said two processor systems to establish a Separate mode of operation in which said two processor systems operate independently and for interconnecting said two processor systems via said cross connecting bus to establish a Duplex mode of operation in which said two processor systems are arranged in duplex configuration such that the CPU of the active system can access the respective memory units in both processor systems simultaneously in response to commands from the CPU in the active processor system, each bus connecting means including means operative in said Separate mode of operation for disconnecting the CPU bus in its processor system from the CPU bus in the other processor system by breaking the connection between the CPU bus in its processor system and said cross connection bus, and means operative in said Duplex mode of operation for connecting the CPU bus in its processor system to the CPU bus in the other processor system by making the connection of its CPU bus through said cross connecting bus to the CPU bus in the other processor system.

2. A duplex data processing system according to claim 1, wherein said bus connecting means comprises:
- an address decoder circuit connected to receive address information from a CPU or input/output controllers operating as a bus master to control said connected CPU buses over said CPU bus, for analyzing the address information to determine an access destination of said bus master, and for producing access destination identification information;
- a bus master monitoring circuit for detecting whether said bus master resides in its processor system or in the other processor system, and for producing resultant detection information;
- mode setting means connected to receive a mode setting command from the CPU in the active processor system over said CPU bus for establishing a Separate mode or Duplex mode, and for producing mode information indicative thereof;
- an address bus gating circuit which includes a first gate connected between an address bus of said CPU bus and an address bus of said cross connection bus, and means responsive to detected information from said bus master monitoring circuit and mode information from said mode setting means for controlling said first gate depending on said received information;
- a control bus gating circuit which includes a second gate connected between a control bus of said CPU bus and a control bus of said cross connection bus, and means responsive to detected information from said bus master monitoring circuit and mode information from said mode setting means for controlling said second gate depending on said received information;
- a data bus gate control signal generator connected to receive decoded information from said address decoder circuit, detected information from said bus master monitoring circuit and mode information from said mode setting means, for determining the data bus direction depending on said received information, and for producing determined information indicative thereof; and
- a data bus gating circuit which includes a third gate connected between a data bus of said CPU bus and a data bus of said cross connection bus, and means responsive to mode information from said mode setting means and determined information from said data bus gate control signal generator for controlling said third gate depending on said received information.

3. A duplex data processing system according to claim 2, wherein said mode setting means comprises:
- a first flip-flop connected to said CPU bus for storing a Separate mode indication or a Duplex mode indication;
- a second flip-flop connected to said CPU bus for storing a Double Write mode indication or Single Write mode indication; and
- a third flip-flop connected to said CPU bus for storing a Read Active System mode indication or Read Stand-by System mode indication.

4. A duplex data processing system according to claim 2, wherein said bus connecting means further comprises:
- a data acknowledge circuit which communicates a data acknowledge signal issued by said access destination of said bus master from said CPU bus to said cross connection bus.

5. A duplex processing system according to claim 1, wherein said bus connecting means in the processor active system includes a first mode setting means connected to receive a mode setting command from the CPU in the active processor system over the CPU bus therein for producing mode information indicative of a Separate mode or Duplex mode of operation; and the bus connecting means in the stand-by processor system includes second mode setting means connected to receive and store mode information from said first mode setting means; said CPU in said stand-by processor system including means responsive to mode information in said second mode setting means which indicates a Duplex mode of operation for disconnecting the CPU in said stand-by processor system from the CPU bus therein.

6. A duplex data processing system with programmable bus configuration comprising:
- a pair of processor systems, each processor system including a central processing unit (CPU), a memory unit, an input/output controller, and a CPU bus connecting said central processing unit, memory unit and input/output controller, the memory units in the pair of processor systems operating with the same address mapping;
- a cross connecting bus provided between said pair of processor systems; and
- bus connecting means provided in each of said processor systems and connected to said CPU bus and said cross connecting bus and adapted to operate in a Separate mode in which said CPU buses of said pair of processor systems are separated and in a Duplex mode in which one processor system operates as an active processor system and the other processor system operates as a stand-by processor system and each CPU of said pair of processor systems is connected via said cross connecting bus so that the central processing unit in the active processor system can access the memory units in both processor systems simultaneously in response to a command from said central processing unit in said one processor system, said bus connecting means including means operating in said Separate mode for disconnecting the CPU bus from said cross connecting bus, and in said Duplex mode for connecting said CPU buses of said processor systems through said cross connecting bus to form a logically unified system.

7. A duplex processing system according to claim 5, wherein said bus connecting means in the stand-by processor system includes mode setting means for producing mode information indicating whether the bus connecting means is operating in the Separate mode or the Duplex mode; and said CPU in said stand-by processor system includes means responsive to mode information in said mode setting means which indicates a Duplex mode of operation for disconnecting the central processing unit in said stand-by processor system from the CPU bus therein.

* * * * *